United States Patent [19]

Fleming

[11] Patent Number: 4,948,297

[45] Date of Patent: Aug. 14, 1990

[54] CORRECTION METHOD FOR CONTAMINATED SITES

[76] Inventor: Joseph W. Fleming, 8381 Post Rd., Allison Park, Pa. 15101

[21] Appl. No.: 383,666

[22] Filed: Jul. 24, 1989

[51] Int. Cl.$^5$ .......................... B09B 1/00; C02F 11/02
[52] U.S. Cl. .................... 405/128; 405/258; 210/615; 210/620; 210/631; 210/901
[58] Field of Search .................... 405/128, 129, 258; 210/600, 601, 615, 620, 631, 901; 435/262, 264, 281

[56] References Cited

U.S. PATENT DOCUMENTS

| | | | |
|---|---|---|---|
| 3,859,799 | 1/1975 | Jaco, Jr. .............................. | 405/128 |
| 3,899,376 | 8/1975 | Azarowicz ....................... | 435/262 X |
| 3,978,673 | 9/1976 | Schleede ............................ | 405/128 |
| 4,584,102 | 4/1986 | Bogart et al. ................... | 405/128 X |
| 4,595,508 | 6/1986 | Wolfe et al. ......................... | 210/631 |

OTHER PUBLICATIONS

Chemical Week Magazine Article entitled "Bacteria Pass a Houston Cleanup Test", published Nov. 11, 1987.

*Primary Examiner*—Dennis L. Taylor
*Assistant Examiner*—Franco S. DeLiguori
*Attorney, Agent, or Firm*—Clifford A. Poff

[57] ABSTRACT

The method essentially creates a lake, if one does not already exist, and uses this lake as a "moving" biological treating pond for contaminated soil sites. Contaminated soil from one side of the lake is dragged into the lake, the water of which is infested with contaminant-consuming micro-organisms, then is tilled at the bottom of the lake to fully expose the soil to biological treatment, and then is raked upwardly along an opposite side of the lake to form a shoreline of cleaned soil material. The earthmoving process is repeated until the lake has passed through the treated all of the contaminated soil site. The method performs all decontamination on-site and avoids the requirement for any backfilling of the side after decontamination of the site.

12 Claims, 4 Drawing Sheets

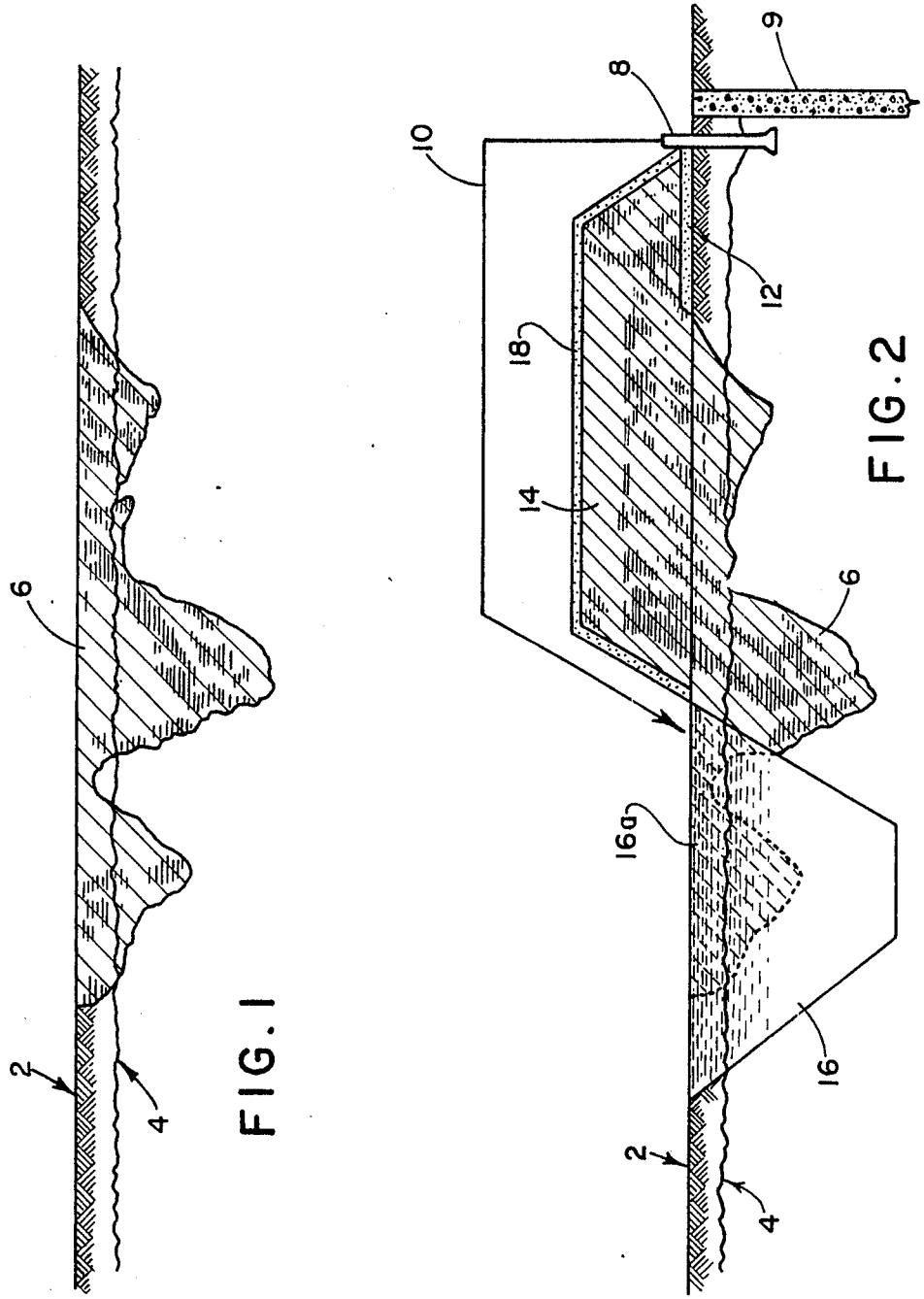

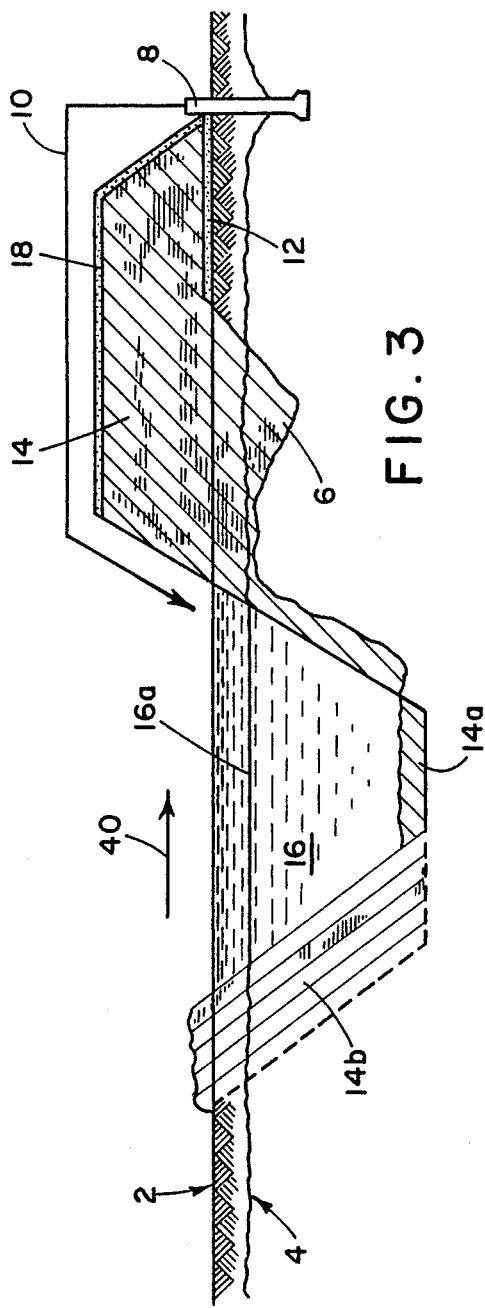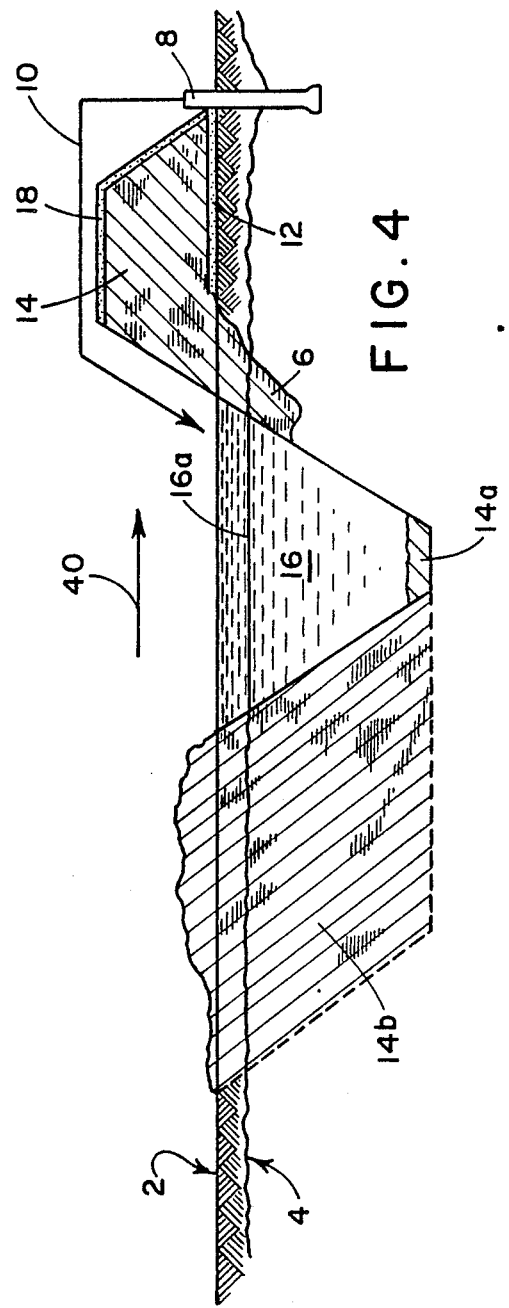

CORRECTION METHOD FOR CONTAMINATED SITES

BACKGROUND OF THE INVENTION

1. Field of the Invention:

The present invention relates to a method for decontamination of contaminated soils and associated groundwaters, in general, and, in particular, to a biological decontamination treatment method involving moving contaminated soil through a standing body of water which acts as a large biologically active decontamination system.

2. Description of the Prior Art:

In the past, there have been proposed a variety of methods for decontaminating contaminated soil sites including, inter alia, industrial chemical by-product dumping sites and mining sites. The contaminating substances disposed at such sites include petrochemicals, coal tar chemicals, penta chloro phenol, arsenic compounds, sulfonated organic compounds and a host of others. The methods that have been suggested and/or practiced can be classified under a number of categories including: treatment without moving the soil on site nor removing the soil from the site, thermal treatment with soil removal from the site, and biological treatment with on-site soil movement.

In the category of treatment without moving the soil on-site nor removing the soil from the site there has been proposed the following methods.

First, it has been proposed to electronically heat a block of soil until melted to a glassy state. While such a method may in fact decontaminate the soil, it undesirably and permanently changes the physical characteristics of the soil.

Second, it is known to enclose a decontaminated area with a cement slurry wall and a clay cap. This method does nothing to reduce or eliminate the contamination but merely serves to contain the contamination. Such a method is prone to high ongoing maintenance costs due to periodic and required testing of the region surrounding the contaminated area to determine if contaminants had escaped from the area and the costs of restoring the slurry wall and/or clay cap if leakage had 10 occurred.

Third, it is known to place interceptor water wells around the perimeter of a contaminated area, then pump the contaminated water out from the contaminated area until the water within the area attains a low elevation, and then biologically treat the contaminated water pumped from the wells. Within this method, there are a series of further treatment options which are available.

A first option is to discard the biologically treated water. With this option, groundwater inflow from outside the perimeter area will keep the contamination "bottled-up" within the boundaries of the contaminated area and will, with time, dilute the concentration of contaminants within the contaminated area to an acceptable level. However, no time prediction can be projected for when the site will be virtually free from contamination.

A second option is to reinject the biologically treated water into the contaminated site in order to move the soil contamination toward the perimeter wells. With this option, clean-up could be erratic and unpredictable due to possible pockets of extremely impervious soil which would lead to uneven groundwater flows.

A third option is to inject biological sludge and oxygen into wells in the contaminated area in the hope of inducing biological activity underground. With this option, unfortunately, the induction of biological activity is not always successful.

A fourth option is to inject solvents, oxygen and other reactive chemicals into the contaminated area in order to decontaminate by chemical reaction. A disadvantage of this option is that it is very inexact and unpredictable.

In the category of thermal treatment with soil removal from the site there has been proposed the use of rotary kilns and externally fired heat treaters.

A rotary kiln has the drawback of mixing heating gases (combustion gases) with gases from the contaminated soil incineration process. This may require the scrubbing of a large volume of gases, and the composition of these gases may widely vary depending upon the contaminant loading in the soil being treated. In addition to the above, a rotary kiln can generate large dust loads in the exhaust gases due to the previously mentioned large volume of gas which occurs when the combustion gases mix with the incineration gases of the treated soil.

An externally fired heat treater is an alternative to the directly-fired rotary kiln. With an externally fired heat treater heat is supplied through the treatment vessel's walls and combustion gases do not come into contact with the soil being treated. However, some combustion gases of low oxygen content could be injected into the treater in order to remove high boiling organic, create a safe low $O_2$ atmosphere, and carbonize any residual organic that do not volatize.

For the soil treatment methods that require the soil be removed, the soil would need to be transported to a treater, treated, and then finally transported to a site that may or may not be the final deposition location for the clean soil. The reason for the uncertainty of the final deposition location is that the water table can be high enough in some locations to cause a virtual mud field to exist so that keeping contamination away from clean soil would be difficult. Also, if the soil to be treated is removed from below the water table, then the water table needs to be lowered by pumping (with appropriate treatment and discard of the pumped water), otherwise the removed soil would be completely saturated with water. If no water was pumped, then the excess water could be drained by placing the treated soil well above the water table for a period of time. In either case, without removal of this excess water, the heat load on the thermal treater would be very high, causing a low through-put rate and high cost of operation of the treater.

If soil removal and treating is pursued, the overall problem reduces to removing contaminated soil, controlling the ground water level in the soil excavation area, treating any soil and water removed from the excavation area and then replacing the clean treated soil in such a manner that the treated does not become contaminated. In the performance of such a treatment operation, the method of actually treating the soil can become secondary to the method of soil handling. Furthermore, the cost of auxiliary work (for instance treating and disposing of a large volume of contaminated water) could exceed the cost of operating a soil treater such as a thermal unit.

In the category of biological treatment with on-site soil movement there has been proposed a method of flooding a contaminated dumpsite area to form a pond, using biological micro-organisms to treat the water and soil of the flooded dumpsite, mixing the contaminated soil of the dumpsite pond bottom into the micro-organism infested water, and backfilling the dumpsite upon completion of the biological treatment process. Such a method has proven to be an effective way of treating contaminated soil areas. However, the costs and logistics of supplying a quantity of fill material sufficient to backfill the site (which sometimes can be many acres in area and 20 or more feet in depth) can become quite prohibitive. It is upon this sort of method that the present invention represents a significant and cost-effective improvement.

It is therefore an object of the present invention to provide on-site decontamination of soil and groundwater without negatively affecting the physical characteristics of the soil being treated.

It is a further object of the invention to provide a method of biological soil and groundwater decontamination which avoids the costs and logistical problems associated with backfilling a decontaminated site with potentially large quantities of fill material.

It is a further object of the invention to provide a method of soil decontamination which will completely cleanse a contaminated site such that when decontamination is completed the site is virtually free of any undesired contaminates.

Still other objects and advantages will become apparent in light of the attached drawing figures and written description the invention presented herebelow.

SUMMARY OF THE INVENTION

The present invention is directed to a method for treating contaminated soil sites. The method may be figuratively referred to as a "Moving Lake" biological treatment method. In the method, a body of water such as a lake is created on one edge of a contaminated area, if one does not already exist, and then, once biological activity has been established, the lake is caused to be slowly "moved" through the contaminated area. The lake would serve as a large biological treating system and any contaminant in the soil and water, if biologically consumable, would be consumed as the lake progressed through the contaminated area. Also, as is known, heavy metal contamination quite often accompanies organic contamination at a contaminated site. If necessary, heavy metal contamination in the form of arsenic, lead, mercury, barium, etc., would be controlled in the lake water by passing filtered lake water over a bed of a cation exchange resin. A cation exchange resin of proper composition will remove substantially all the heavy metals from a solution.

More specifically, a lake is usually formed by dredging soil at one side of a contaminated area to a depth which is at least as great as the maximum depth of contamination within the contaminated area. The soil which is dredged is piled on top of the remaining contaminated soil in the area. Either the natural surrounding water table or supplementary water wells can be tapped to fill the dredge area with water to form the lake. The lake is then provided with an initial supply of rapidly-reproducing, contaminant-consuming micro-organisms.

The lake is then caused to move by raking a portion of the piled contaminated soil forming the shore material at one side of the lake downwardly into the bottom of the lake. The contaminated soil at the bottom of the lake, and any residual contamination within the lake water, is then subject to the biological treatment of the micro-organisms. To ensure that the soil at the bottom of the lake is completely treated, the bottom of the lake is tilled with discs or harrows to fully expose all of the contaminated soil to the lake water.

At such time when the portion of the soil which was dragged to the lake bottom becomes fully treated or "cleaned" by the biological system, such treated bottom material is then dragged up onto the shore of the lake which is opposite to the contaminated soil side of the lake in order to form a lake shore of fully cleaned soil. A new quantity of contaminated shore material is then raked downwardly into the lake bottom. Again, when this portion of contained soil is tilled and fully treated, it too is dragged up onto the opposite side of the lake to further build up the "clean" shoreline.

The cycle is repeated until all of the contaminated soil has been sequentially treated by the passage thereof through the biological system within the lake water. Simultaneously, the impression is given of a lake which gradually "moves" through a contaminated area by the continual removal of shore material from a first side of the lake which is then transferred to build up the shore material at the opposite side of the lake.

The treatment process is completed when the last remaining portion of the soil is raked into the lake to essentially fill the remaining volume of the lake. The microorganisms remaining in the lake consume the final portions of contaminants in both the soil and the remaining lake water. When all of the contaminants are consumed, the micro-organisms essentially die of starvation and what remains is a fully treated and cleaned soil area where there once was contaminated soil.

BRIEF DESCRIPTION OF THE DRAWINGS

FIG. 1 is cross-section of a contaminated soil site;

FIGS. 2-5 are sequential illustrations of the creation of a biological contaminant treatment lake and the gradual movement thereof through the contaminated soil site illustrated in FIG. 1.

DESCRIPTION OF THE PREFERRED EMBODIMENT

Figure 5:
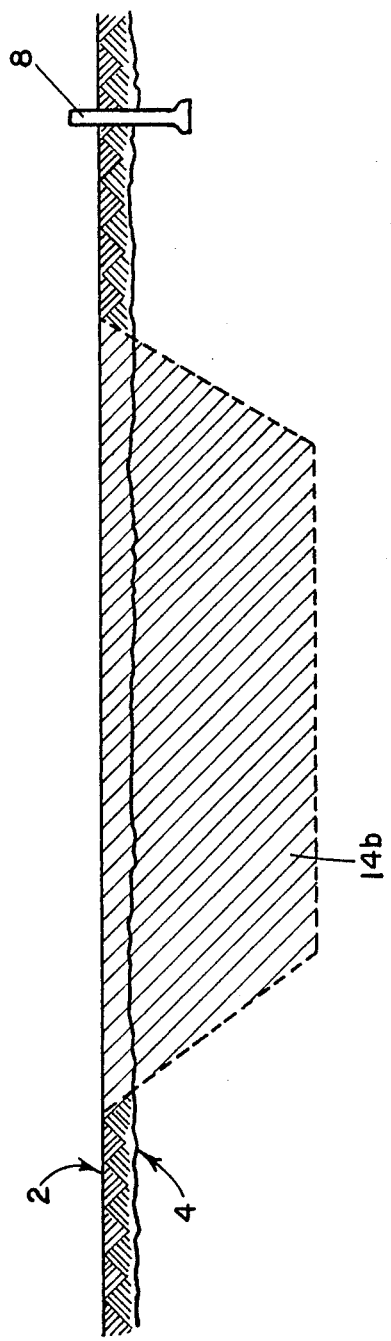

Before the method of the present invention can be performed, a complete hydrogeological assay of the contaminated site would be required. Information obtained from the data of the assay would include: (A) topographical representation of the water table, (B) ground water flow directions and rates, (C) extent, concentration and types of contaminants present, (D) The expected rate of biological consumption of the various contaminants, and (E) the types of soil present throughout the contaminated area.

From the above information, the following plan is developed: (A) Determine the initial required lake area and depth, (B) Determine the initial lake site and intended movement direction, (C) Determine the necessity for slurry walls and/or containment wells, their locations and the required pumping rates of the wells, (D) Determine the necessity for heavy metal 25 removal from the lake water, and (E) Determine the hardware necessary for moving and tilling the soil, and for agitating and aerating the lake. Once the aforementioned plan is developed the "moving lake" method is performed in accordance with FIGS. 1-5.

Depicted in FIG. 1 is a cross-section of the contaminated site as determined from the hydrogeological assay. Shown is the existing soil surface 2, the existing water table 4 and the contaminated soil site 6. If the contamination of contaminated soil 6 is fairly well contained and is not moving vertically or laterally with any significant speed, there may be no necessity for contaminant migration prevention means such as perimeter wells as indicated by well 8 and/or slurry walls as indicated by wall 9 (FIG. 2).

If there is significant lateral or vertical movement of the contamination or if the water table 4 is too low, slurry walls may need to be installed to contain the water inside the walls or perimeter wells 8 may need to be drilled. If the water table is too low, water will need to be pumped from wells 8 through pipeline 10 into the biological treatment lake which is described in greater detail hereinbelow. For the case of contamination movement, water will be pumped from the wells 8. If the water table 4 is too low, water could be pumped into the wells 8.

Once the contaminant migration at the perimeter has been closed off by a slurry wall or a high water table level is induced by water injection into the perimeter wells 8, additional off-site water can be added to produce a lake with an artificially high water table inside the perimeter slurry wall 9 or perimeter water injection wells 8. To control movement of contaminants due to ground water flow, the injection of clean off-site water into the perimeter wells inside a slurry wall (if present) would induce any contaminants to migrate towards the lake.

FIG. 2 illustrates clearly the initial stage of operations of the "moving lake" method of the present invention. First, an impervious layer 12 is placed atop soil surface 2 at one side of contaminated soil site 6 and extending the full length thereof. Impervious layer 12 will stop migration of contamination from soils which are placed thereabove and impervious layer 12 should be sloped toward the contaminated soil site 6 so that any water reaching the impervious layer 12 will flow toward the contaminated soil site, e.g. to the left in FIG. 2.

A quantity of contaminated and uncontaminated soil 14 is excavated from the side of contaminated soil site 6 which is opposite to the impervious layer 12. This quantity of soil 14 is then placed on top of the balance of the contaminated soil site 6 (including impervious layer 12). The original location of the contaminated portion of excavated soil 14 is shown in dashed lines in FIG. 2. In some cases it may be desirable to start the lake in an uncontaminated location, in which case the lake 16 would be located further to the left in FIG. 2.

The excavation of soil 14 is always carried out such that it completely removes the furthest lateral extent of the contaminated soil at the side of the contaminated soil site 6 which is opposite to the impervious layer 12. The removal of soil 14 causes ground water to flow into the excavated area to form lake 16 having a water surface 16a substantially at the level of water table 4. When a sufficient amount of soil 14 has been excavated so that the lake 16 is of the desired size, the soil 14 that has been excavated and placed atop contaminated soil 6 will be graded so that rainfall will be directed towards the lake 16. After grading, the soil 14 is capped with a suitable layer 18 of water impervious material such as Bentonite. This capping layer 18 will protect the soil 14 from rainfall permeation. If desired, impervious layer 12 may be similarly formed of Bentonite.

It is to be noted that the length of the lake 16 will be at least as long as the contaminated soil site 6 and the width would be dependent upon the depth to which the lake 16 must reach. The depth of the lake 16 is required to be at least equal to the maximum depth of the contamination at site 6. As the lake 16 is moved across a contaminated area, the depth of the lake could be changed by manipulation of suitable earth moving equipment such as, for example, a dragline. Operation of such equipment with particular regard to the present invention is described in greater detail herebelow. When the lake 16 is of the desired size then a small initial quantity of rapidly-reproducing, contaminant-consuming micro-organisms are introduced into the lake 16.

Figure 6:
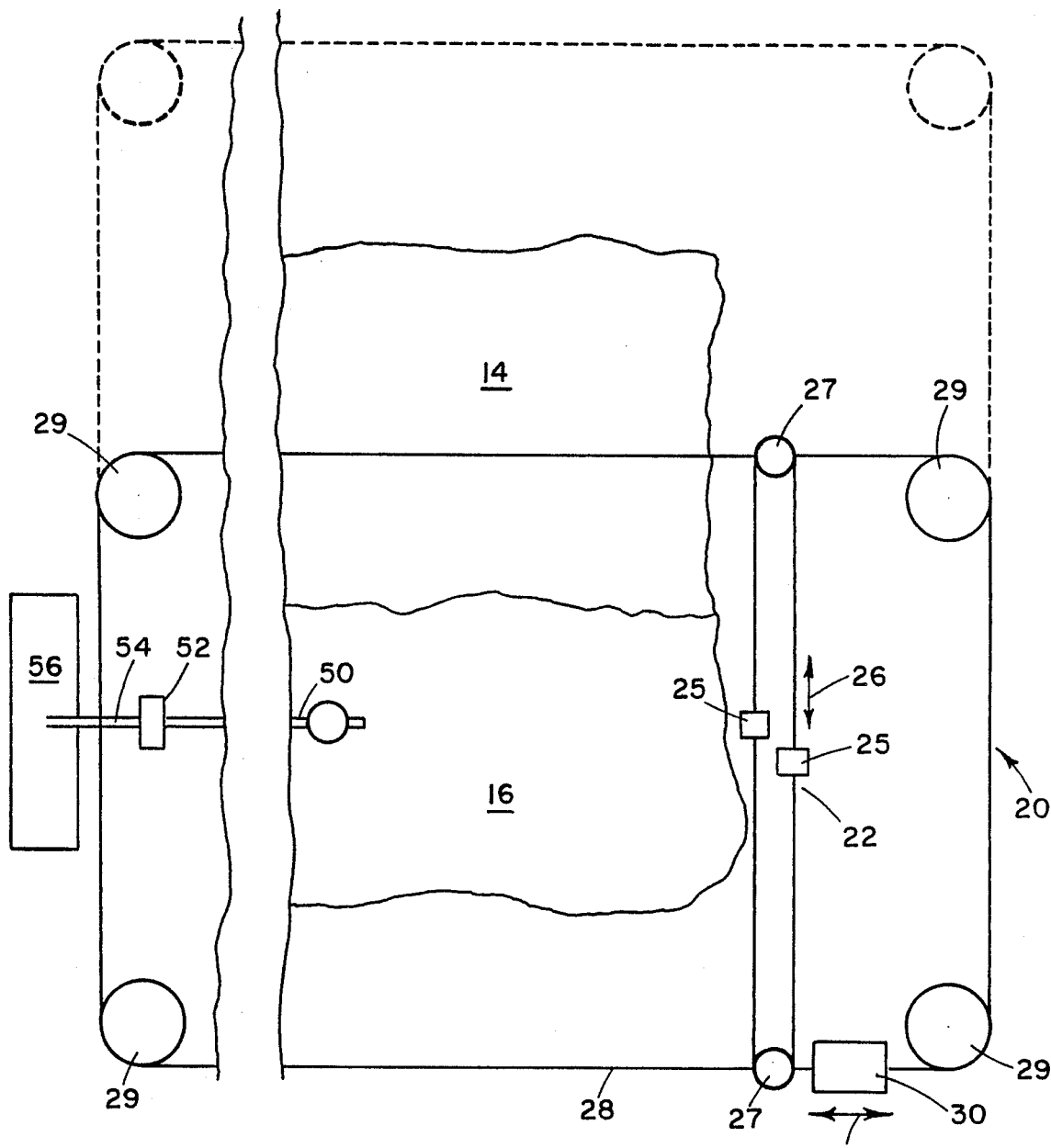
FIG. 6 is a plan view of a heavy metal decontamination system usable with a biological contaminant treatment lake and an earthmoving apparatus which may be used to drag material from the contaminated shore of the biological treatment lake, then through the lake, and then to the clean side of the lake.

The newly formed lake 16 is provided with an earthmoving equipment system 20 such as, for example, at least one dragline 22 which can be seen in FIG. 6. The earthmoving equipment system 20 illustrated in FIG. 6 is merely illustrative of an earthmoving equipment system which will satisfactory perform the objectives of the present invention. However, it is contemplated that any suitable underwater dragging and/or tilling equipment may be used in the place of the earthmoving equipment of FIG. 6.

As can be seen in FIG. 6, each dragline 22 includes a dragline cable 24 having plurality of interchangeable tools 25 supported thereon. Tools 25 may include scraper buckets for dragging or raking soil 14 down into the bottom of the lake or for dragging treated soil up from the bottom of the lake 16 to form a shoreline of cleaned soil. Tools 25 may then be changed to include harrows or discs when it is required to till the soil 14a located at the bottom of the lake 16 such that the soil 14a becomes fully biologically treated by the micro-organisms in the lake.

The dragline cable 24 is reversibly movable by a driving means (not shown) in the directions indicated by arrow 26 in FIG. 6. Forming the dragline cable 24 into a loop are a pair of spaced pulley means 27 such as, for example, block-and tackle devices. Pulley means 27 are each secured to, and are translated with, a cable 28 which is passed around a plurality of pulleys 29. Opposite ends of cable 28 are secured to a traction means 30 such as a truck, locomotive, tractor or the like, so as to be translatable in the directions indicated by arrow 32. Translation of the at least one dragline 22 in the directions of arrow 32 permits the full length of the contaminated soil 14 to be raked into, treated in, and dragged from lake 16

It should now be appreciated that the tools 25 of the at least one dragline 22 are used to rake a first portion of contaminated soil into lake 14 and then till the contaminated soil 14 in the lake. The tools 25 then rake or drag the treated soil from the bottom of the lake up onto the opposite shoreline of lake 16. When this earthmoving sequence is completed, then the entire earthmoving equipment system 20 is moved forwardly (as indicated in dashed lines in FIG. 6) into the direction of the pile of soil 14 and the sequence is repeated. The earthmoving is completed when all of the soil 14 and the underlying contaminated soil from site 6 is decontaminated by the movement of lake 16 therethrough. A sequential cross-sectional view of this operation is seen in FIGS. 2-5 with earthmoving equipment system 20 omitted for purposes of clarity.

Referring specifically to FIG. 3, it can be seen that several of the aforementioned earthmoving sequences have been completed. That is to say, several times a portion 14a of soil 14 has been dragged down into the bottom of lake 16, then tilled for complete biological purification treatment thereof, and then dragged up onto the opposite side of lake 16 to form a mass of cleaned shoreline material 14b. As the series of earthmoving sequences progresses, the lake 16 is caused to move through the contaminated soil site in the direction of arrow 40. As necessary, air spargers (not shown) will be placed in the lake to maintain the lake at all times in a well mixed and aerated condition. Still further, nitrogen and phosphate containing nutrients will be periodically added to the water in lake 16 to further enhance biological activity.

As mentioned previously, it is well known that heavy metal contamination quite often accompanies organic contamination. While biological decontamination proceeds in the lake 16, heavy metal content in the lake may be maintained within an acceptable range, and preferably substantially eliminated, by using the heavy metal decontamination system depicted in FIG. 6. Lake water bearing heavy metals in solution is pumped from lake 15 16 by pump P along line 50, through filter means 52, and then along line 54 where it is then passed over a bed of cation exchange resin 56. The bed of cation exchange resin 56, if formed of proper composition, will remove substantially all the heavy metals from the lake water solution.

The lake movement is governed by the rate at which biological activity can clean up the contaminated soil lining the lake and also how well any water from containment wells is handled. The lake water will at all times have an acceptable low concentration of contaminants, both organic and heavy metal. What the lake provides is a very large biological system. Instead of pumping water through the system as in a normal activated sludge system, the same water is held in the system and the contaminated soil is moved through treating system. When the contaminated soil lining the lake 16 is cleaned, the system (the lake) moves on.

As can be seen in FIG. 4 the lake 16 has moved a significant distance across the contaminated soil site. As the amount of contaminated soil 14 above-ground gets smaller, the volume of the lake 16 also gets smaller.

FIG. 5 illustrates the condition in which the lake has progressed completely across the contaminated soil site 6 and has been filled in by the treated soil 14b. In this final condition, the micro-organisms contained in the lake 16 have consumed the contamination in the above-ground soil 14, the underlying soil of contaminated soil site 6, and any contaminants remaining in the 15 treatment water. When all of the contaminants have been consumed, the micro-organisms die of starvation and what remains, after suitable leveling by tractors or the like, is a fully treated and cleaned soil site where there once was contaminated soil. Containment wells 8, if used, will accordingly be plugged upon completion of the decontamination process.

The "moving lake" method of the present invention performs all decontamination on-site. Moreover, the method completely avoids the logistical problems and the costs associated with supplying sometimes extremely large quantities of backfill material to fill the site after decontamination is complete, as is common practice in prior large-scale biological treatment systems.

Still further, it should be understood that it is not always necessary to form a lake at one side of a contaminated soil site if one already exists. The step of first forming a lake was described hereinabove, however, since it is in accordance with the fullest and preferred embodiment of the invention.

While the present invention has been described in accordance with the preferred embodiments of the various figures, it is to be understood that other similar embodiment may be used or modifications and additions may be made to the described embodiment for performing the same functions of the present invention without deviating therefrom. Therefore, the present invention should not be limited to any single embodiment but rather construed in breadth and scope in accordance with the recitation of the appended claims.

I claim:

1. A method for decontaminating contaminated soil sites, said method comprising the steps of:
   (a) introducing biological contaminant-consuming micro-organisms into a body of water which is adjacent the contaminated soil site;
   (b) moving a portion of contaminated soil located along a first side of said body of water into said body of water;
   (c) permitting said micro-organisms to biologically decontaminate said portion of contaminated soil in order to form a portion of decontaminated soil;
   (d) moving said portion of decontaminated soil to a second side of said body of water to form shore material of decontaminated soil at said second side; and
   (e) repeating steps (b) through (d) until substantially all portions of contaminated soil are decontaminated by said micro-organisms.

2. The method of claim 1 further comprising filling in the volume of said body of water with a final portion of said contaminated soil which is moved into said body of water and decontaminated by the micro-organisms contained therein.

3. The method of claim 1 further comprising, prior to step (a), the step of forming said body of water by excavating soil from along a side of the contaminated soil site for at least the full length thereof to form an excavated area and filling said excavated area with water to a predetermined level.

4. The method of claim 3 wherein said step of forming said body of water further comprises excavating said soil to a depth at least as great as the greatest depth of contamination within the contaminated soil site.

5. The method of claim 3 further comprising, prior to step (a), placing soil excavated from said excavated area atop said contaminated soil at the first side of said body of water whereby the excavated soil then forms a part of said contaminated soil.

6. The method of claim 1 wherein step (c) further comprises tilling the contaminated soil moved into said body of water to fully expose the contaminated soil for complete biological treatment thereof by said micro-organisms.

7. The method of claim 1 further comprising maintaining a content of heavy metals present in said body of water within an acceptable range while biological decontamination proceeds in said body of water.

8. The method of claim 7 wherein said step of maintaining a content of heavy metals within an acceptable range comprises removing heavy metals from said body of water by passing water from said body of water through a filter means and then passing the filtered water over a bed of cation exchange resin in order to remove the heavy metals from the filtered water.

9. A method for decontaminating contaminated soil sites, said method comprising:
(a) forming a body of water by excavating soil from along a side of a body of contaminated soil for at least the full length thereof to form an excavated area and then filling said excavated area with water to a predetermined level;
(b) placing soil excavated from said excavated area atop said body of contaminated soil whereby the excavated soil then forms a part of said body of contaminated soil, said body of contaminated soil thus being positioned along a first side of said body of water;
(c) introducing biological contaminant-consuming microorganisms into said body of water;
(d) moving a portion of said body of contaminated soil positioned along said first side of said body of water into said body of water;
(e) permitting said micro-organisms to biologically decontaminate said portion of said body of contaminated soil in order to form a portion of decontaminated soil;
(f) moving said portion of decontaminated soil to a second side of said body of water to form shore material of decontaminated soil at said second side;
(g) repeating steps (d) through (f) until substantially all portions of said body of contaminated soil are decontaminated by said micro-organisms; and
(h) filling in the volume of said body of water with a final portion of said body of contaminated soil which is moved into said body of water and decontaminated by the micro-organisms contained therein.

10. The method of claim 9 wherein step (e) further comprises tilling the contaminated soil moved into said lake to fully expose the contaminated soil for complete biological treatment thereof by said micro-organisms.

11. The method of claim 10 further comprising maintaining a content of heavy metals present in said body of water within an acceptable range while biological decontamination proceeds in said body of water.

12. The method of claim 11 wherein said step of maintaining a content of heavy metals within as acceptable range comprises removing heavy metals from said body of water by passing water of said body from water through a filter means and then passing the filtered water over a bed of cation exchange resin in order to remove the heavy metals from the filtered water.

* * * * *